United States Patent [19]

Farrell

[11] Patent Number: 5,167,672
[45] Date of Patent: Dec. 1, 1992

[54] METHOD AND DEVICE TO SUSTAIN A CUT FLOWER AND ITS BLOSSOMS

[76] Inventor: Michael E. Farrell, 4707-4 Via La Paloma, Orange, Calif. 92669

[21] Appl. No.: 260,948

[22] Filed: Oct. 21, 1988

Related U.S. Application Data

[63] Continuation-in-part of Ser. No. 203,380, Jun. 6, 1988, abandoned, which is a continuation-in-part of Ser. No. 50,262, May 14, 1987, abandoned.

[51] Int. Cl.[5] .......................... A01H 1/00; A01G 5/00; A01G 31/00; A01G 25/00
[52] U.S. Cl. .......................... 47/58; 47/41.13; 47/62; 47/63; 47/81
[58] Field of Search .............. 47/58, 62, 63, 81, 41.13; 435/311

[56] References Cited

U.S. PATENT DOCUMENTS

| | | | |
|---|---|---|---|
| 3,842,539 | 10/1974 | Sacalis | 47/58 |
| 4,103,457 | 8/1978 | Carlisle | 47/58 |
| 4,531,324 | 7/1985 | Yang et al. | 47/81 |

OTHER PUBLICATIONS

Dodds et al., 1982, pp. 10-13 In: Experiments in plant tissue culture, Cambridge Univ. Press: New York.
de Stigter, Water Balance of Cut and Intact Sonia Rose Plants 1980 pp. 131-140 Z. Pflanzenphysiol. vol. 99.
Conger, Cloning Agricultural Plants via in vitro Techniques 1981 p. 178.

*Primary Examiner*—David T. Fox
*Attorney, Agent, or Firm*—Adam Cochran

[57] ABSTRACT

A plant stem is provided with liquid only after the liquid has passed through a membrane having a porosity which is insufficient to permit the passage of microorganisms with the liquid to the stem.

12 Claims, 3 Drawing Sheets

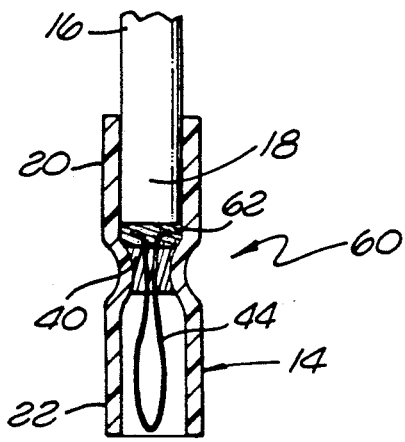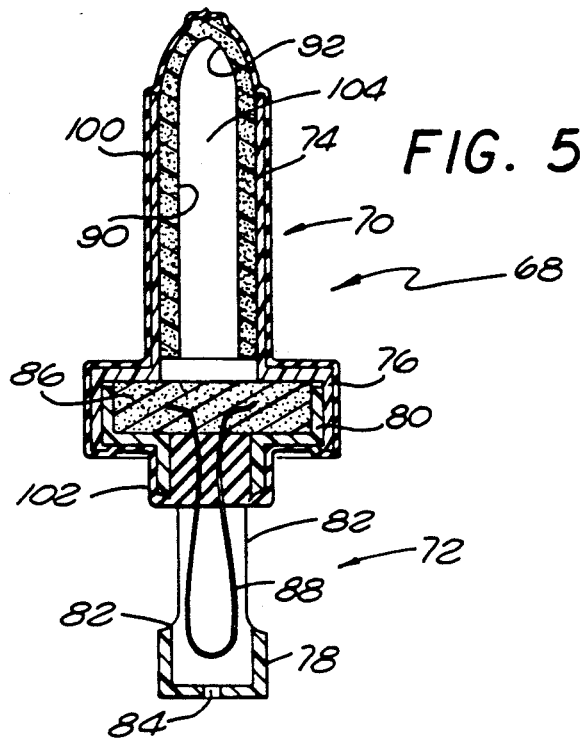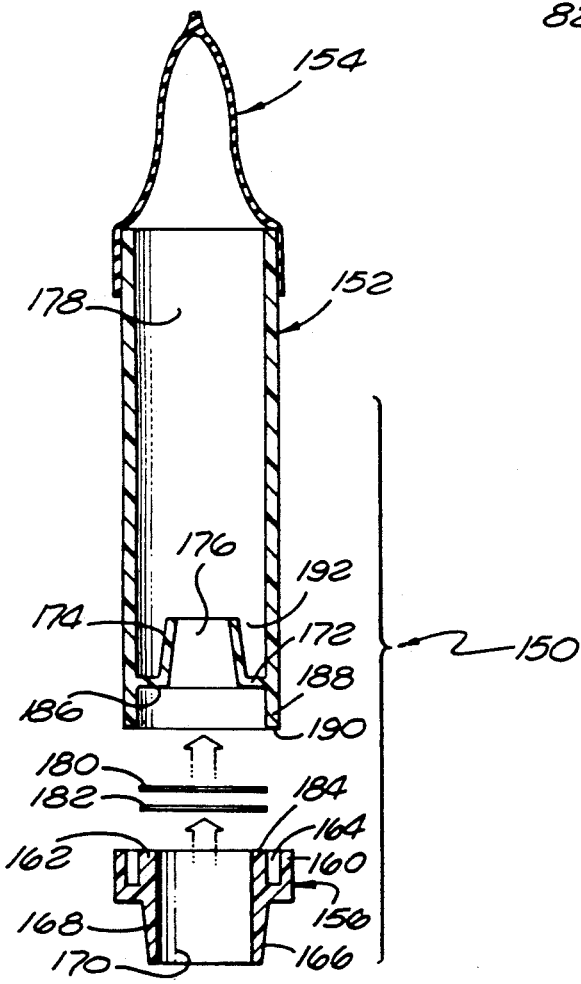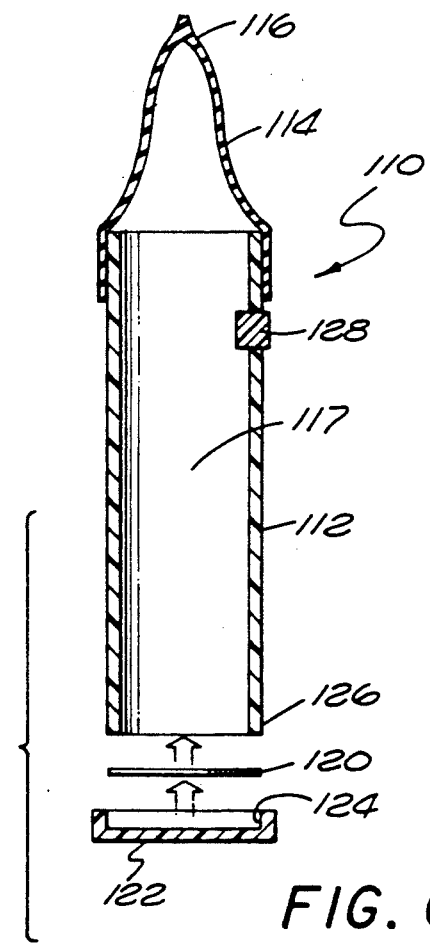
FIG. 4
FIG. 5
FIG. 7
FIG. 6

METHOD AND DEVICE TO SUSTAIN A CUT FLOWER AND ITS BLOSSOMS

This is a continuation-in-part of application Ser. No. 203,380 filed Jun. 6, 1988, now abandoned, which is a continuation-in-part of application Ser. No. 050,262 filed May 14, 1987, now abandoned. The disclosure of that application is incorporated by reference herein.

FIELD OF THE INVENTION

This invention relates generally to the field of the botanical sciences, and more particularly to a method of preserving the life of a cut plant or flower.

BACKGROUND AND SUMMARY OF THE INVENTION

It is a common practice to sustain the life of cut plants such as flowers by means of inserting a basal end of the plant stem in a reservoir containing a liquid such as water, or a nutrient liquid. Such a method provides some increase in the life of a plant or flower, but for many varietals the flower lasts but one or two days prior to the onset of wilting even when the cut stem of the flower is immersed in a liquid-containing reservoir such as a vase. It should be understood that the term liquid as used herein is meant to include water, a water solution containing plant nutrients, or any other solution in which a plant stem is immersed to sustain the plant.

Accordingly, it has been a desideratum to develop a method or device for increasing the life of flowers or other plants which are cut from their natural state. For example, U.S. Pat. No. 3,842,539 discloses a device which inhibits the flow of water to a stem of a cut flower, and contains ion exchange resin to remove harmful ions from the water. The method involves the placing of the basal end of the flower stem in a conduit or tube, and the water enters the basal end of the stem only after passage through the resin mass. U.S. Pat. No. 4,103,457 discloses a totally enclosed nutrient liquid supply system including a pouch, tubing and latex sleeve around the stem of the flower, with pressure on the pouch feeding liquid to the stem. The enclosure of the liquid supply system is said to inhibit contamination of the nutrient liquid during protracted periods. The disclosures of U.S. Pat. Nos. 3,842,539 and 4,103,457 are both incorporated herein by reference.

While these two patents have attempted to preserve the life of cut flowers, the methods are significantly complex and costly, and even so fail to provide a practical or successful method or device for preserving the life of a cut plant or flower.

The present invention provides a novel system for providing liquid to a cut plant wherein substantially all the liquid required by the plant is presented to a basal end of the plant stem only after passage through an apparatus which includes a filtration means having a porosity which is sufficient to permit liquid to pass from the reservoir to the stem, but insufficient to permit the passage of microorganisms with the liquid.

In a preferred embodiment, all liquid required by the plant passes through a porous membrane having a porosity which is insufficient to pass microorganisms. As used herein, the term microorganism is meant to include all organisms such as bacteria, fungi and viruses which are harmful to plant survival (i.e., pathogenic organisms) or microscopic or submicroscopic organisms which grow on a nutrient substrate such as plant tissue. While I do not wish to be bound to any particular theory, it appears that plant wilting, when the cut stem of a plant is immersed in a nutrient liquid or water, is due primarily to the growth of such microorganisms on the exposed xylem tissue of the cut stem, which blocks the flow of liquid into the xylem tissue or, in the case of pathogenic microorganisms, may tend to poison the plant. When the plant's vascular system is thus blocked, the negative pressure on the vascular system from transpiration from the plant leaves causes cavitation, which results in the collapse of the vascular system and wilting of the plant.

Broadly, one aspect of the invention comprises providing a conduit or tube having an end adapted to receive a basal end of the plant stem, and including a means to seal a stem receiving portion of the apparatus and the basal end therewithin from the influx of microorganisms while permitting the transport of water or a nutrient medium. Preferably, this stem receiving portion of the apparatus is sterilized prior to use to assist in maintaining the basal end of the isolated from microorganisms.

A portion of the conduit is adapted to be exposed to the liquid in the reservoir. A filtration means such as a membrane or a filtering portion of the apparatus is disposed between the stem receiving portion and the liquid in the reservoir in a manner such that all liquid which passes to the plant from the reservoir must flow through this filtration means, having a porosity which is insufficient to permit the passage of microorganisms, so that the described blockage of the liquid flow is avoided.

Generally, a filter having an effective porosity of less than 3 microns, preferably from about 0.05 to about 0.45 microns, is sufficient to permit the passage of liquid such as water to the stem, but insufficient to permit the passage of deleterious microorganisms with the liquid. Most preferably, a filter having an effective porosity of about 0.2 microns or less is employed. Effective porosity, as used herein, is defined as the ability of the filter to resist the transfer of particles of the specified size.

The hydrophilic filters of the invention, that is, filters which pass liquid but are capable of excluding the passage of microorganisms to the stem, also serve to inhibit the passage of air bubbles (emboli) which might otherwise enter and "air-lock" the plant's vascular system, blocking the uptake of liquid and contributing to wilting, while permitting the passage of dissolved gases necessary for sustaining the plant.

As shown in the embodiments described herein, the filtration means may be a planar film having the appropriate porosity, or may comprise a porous mesh-like or woven polymer which acts as a depth filter, that is, a polymer which has an effective porosity sufficiently small to resist the passage of microorganisms even though the actual porosity of a thin layer of the material is larger than the required amount. The filtration means may also be a hollow fiber having a lumen with a diameter which is sufficient to permit the fiber to wick the fluid from the reservoir to the stem, if no liquid pressure is applied, and a wall porosity which is sufficient to permit the transport of liquid but insufficient to permit the passage of microorganisms with the liquid.

The hollow fiber may have a wall porosity of less than 3 microns, preferably from about 0.05 to about 0.45 microns, and most preferably having a porosity defined by having pores of less than about 0.2 microns diameter. Such fibers may be made, as is known in the art, from a hydrophilic resinous material. Since the basal end of the plant stem is sealed within a first portion of the conduit, flow through this filtration means is the only source of liquid for the plant and the plant accordingly receives fluid from the reservoir in the absence of deleterious microorganisms.

In another aspect of the invention, the sterile conduit portion includes a bactericidal means disposed to be adjacent the stem to further protect the cut end of the stem from the influx of microorganisms which contributes to vascular blockage.

Another contributing cause of wilting in cut flowers and plants is improper liquid pressure on the plant's vascular system. The transport of water in a natural plant is the result of a combination of "pull" from the evaporation of water from the leaves and "push" from pressure created by the roots. When a plant is harvested the positive pressure on the vascular system from the roots is removed, and if the plant stem is of sufficient height it appears that cavitation will occur, that is, the formation and collapse of regions of low pressure, and massive tissue damage ensues which promotes the death of the cutting.

According to another aspect of the invention, significant additional advantages with respect to longer stemmed plants are provided by the use of a pressure system which produces a pressure of from about 0.9 to about 1.2 psi to the liquid at the cut end of the plant stem. Broadly, a method for preserving a plant having a stem, wherein the stem is supplied from a liquid source with a liquid is provided which includes placing a basal end of the stem in an apparatus having a conduit with sealing means disposed around the stem which seal the conduit portion and the basal end therewithin against the influx of microorganisms, and providing a pressure of from about 0.9 to about 1.2 psi on the liquid at cut end of the stem. Preferably, the liquid in the liquid source is sterile.

Significant advantages result from the combination of the filtration device and the pressure system. Preferably, a device for the display of a plant having a stem with a basal portion including a cut end is provided which comprises a first portion adapted to contain liquid; a second portion defining an area adapted to receive the cut end of the stem, and to receive liquid from the first portion; and a sealing means on the second portion, adapted to enclose the basal portion of the stem and seal the stem against the egress of liquid from the device. The display device also includes a filter having a porosity of from about 0.05 to about 0.45 microns disposed between the first and the second portions and disposed to seal the second portion from the first portion in a manner such that microorganisms cannot flow from the first to the second portion, and means for providing a pressure of from about 0.9 to about 1.2 psi on the liquid at cut end of the stem.

Since long stemmed plants also benefit from a positive pressure system during transport, a novel method for the transport of plants is provided wherein the filtration device of the invention is filled with water and attached to the cut end of the plant, and the plant is then positioned with the leaves or flower lower than the cut stem, so that the combined stem and device act as a water column to provide sufficient pressure to overcome the tendency of the vascular system to cavitate.

BRIEF DESCRIPTION OF THE DRAWINGS

FIGS. 3 and 4 are cross-sectional side views of alternative devices of the type shown in FIGS. 1 and 2;

FIG. 5 is a cross-sectional side view of an additional embodiment of the filtration device;

FIG. 6 is a cross-sectional side view of yet another embodiment of the filtration device;

FIG. 7 is a cross-sectional side view of still another embodiment of the filtration and support device;

DETAILED DESCRIPTION OF THE PREFERRED EMBODIMENT

Figure 1:
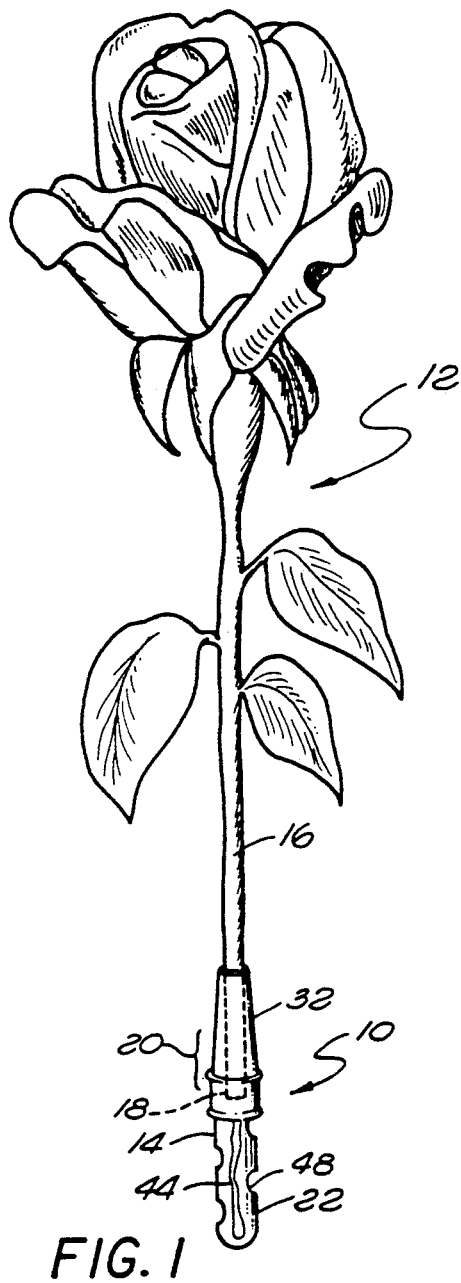
FIG. 1 is a perspective view of a filtration and stem support device useful in increasing the life of a cut flower in water, shown in position attached to the basal end of the flower stem.

Referring to FIG. 1, there is seen a unitary, i.e., one-piece, device 10 for increasing the life of a cut flower 12. This device 10, as seen in detail in FIGS. 2, 3 and 4, includes a conduit or tube 14 which receives a stem 16 of the flower 12. Specifically, a basal end 18 of the stem 16 is received in a first conduit portion 20, and a second conduit portion 22 of the conduit 14 is adapted to be disposed in a reservoir of water or other liquid such as a nutrient solution.

Figure 2:
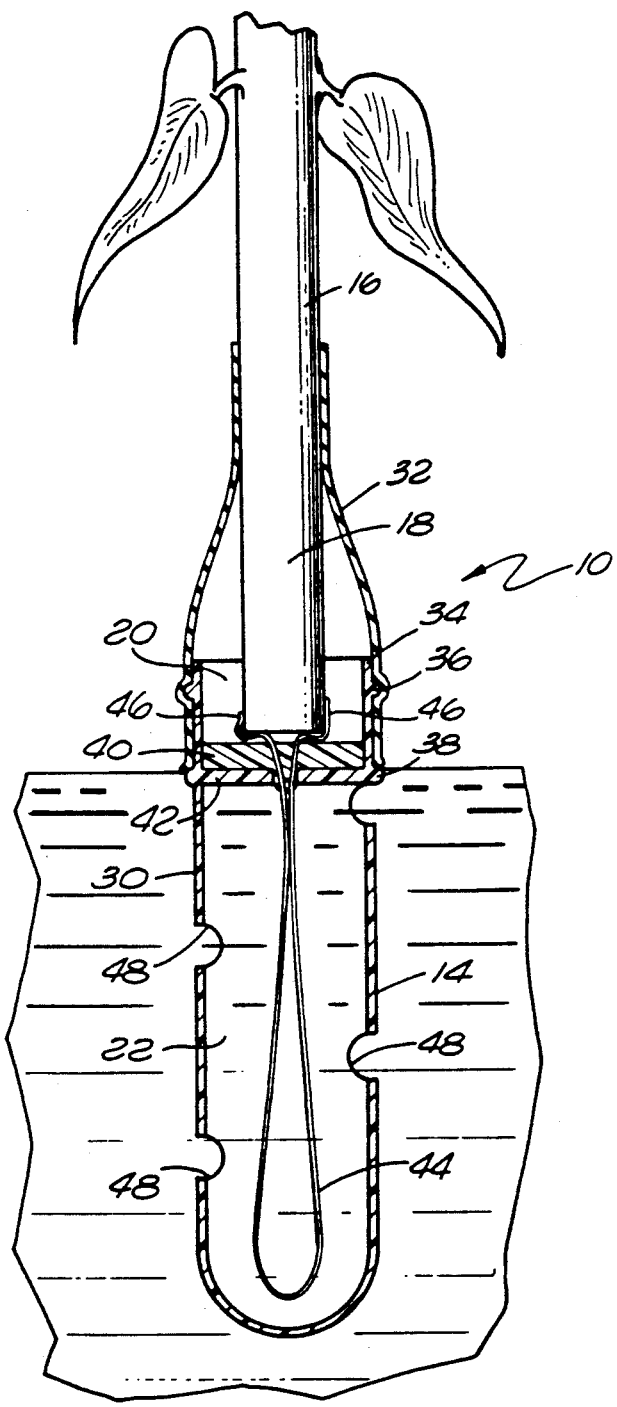
FIG. 2 is an enlarged, cross-sectional side view of a similar device installed on a plant stem and immersed in water.

Turning now to FIG. 2, the device 10 is seen to include, in this embodiment, a casing 30 made of solid, resinous material commonly referred to as plastic. A stiff, resilient rubber-like material is particularly advantageous. The basal end 18 of the stem 16 is seen to be included in the first portion 20, and sealed against the influx of liquid and microorganisms by a sealing means 32 which is seen to be constructed of a flexible, resilient material such as latex or the like which tightly encircles the stem 16 as well as the outer wall 34 of the conduit 14 surrounding the first portion 20.

In this regard, ridges 36 and 38 may be formed in the wall 24 to assist in the sealing of the latex means 32 against the wall 34 and to provide positioning ridges so that the resilient seal 32 may be rolled or convoluted downwardly around the walls of the first portion 20 for insertion of the basal end 18 of the stem. This is described in more detail with respect to FIG. 3. The resilient means 32 may be retained on the walls of the first portion 20 by the elastic pressure inherent in such resilient material, or may be adhesively attached thereto.

The first portion 20 is seen to be sealed and isolated against the flow of microorganisms along with the liquid from the second portion 22 by a second sealing means 40 which is seen to be formed above a platform 42 disposed between the first portion 20 and the second portion 22 of the conduit 14. The sealing means 40 may be formed from a wide variety of polymers, preferably a non-hydrophilic, high-viscosity polymer such as silicone or polyurethane which is compatible with and non-toxic to the flower, and which is non-invasive with respect to the porosity of the fiber walls.

The flow of liquid from the second portion 22 to the flower is provided solely by a filtration means comprising a hollow fiber 44. This fiber is preferably formed from a hydrophilic material and has a lumen which will permit the flower to wick fluid through the fiber and a wall porosity which will permit the passage of water through the fiber wall at a quantity sufficient to inhibit wilting of the flower, yet a porosity which is insufficient to permit the passage of microorganisms through the fiber wall.

The hollow fiber 44 has a lumen diameter of up to about 400 microns, preferably up to about 120 microns, and transverse channels which provide a porosity of from about 0.01 to 0.45 microns, preferably less than about 0.2 microns. The fibers are preferably made from a hydrophilic resinous material such as cellulose nitrate and/or cellulose acetate, and the hydrophilic porosity provided by the channels which are formed in the fiber wall permits the influx of liquid, which is then transported by capillary action to the natural xylem tissue contained in the basal end 18 of the flower. The channels and fibers employed are described and shown in some detail in FIG. 10 of application Ser. No. 07/050,262, filed May 14, 1987, now abandoned which is specifically incorporated herein by reference. A preferred fiber is that manufactured by Microgon Company of Laguna Hills, Calif., and identified by the designation CHF-96B-263 having a nominal pore size of 0.1 microns. Since the hollow fiber filtration means inhibits the passage of microorganisms, and since the wicking action of the flower can draw fluid only through this filtration means, the flow of liquid into the basal end of the stem 18 cannot be blocked by the growth of organisms across the natural xylem tissue of the flower.

The upper ends 46 of the looped fiber 44 are seen to be adjacent, or abut, the natural xylem tissue of the flower. While one such hollow fiber is sufficient to pass sufficient liquid (150 ml/day) to sustain a flower such as a rose, additional looped fibers may be included. Single fibers may also be used as long as the lumen disposed in the second portion 22, that is, the end of the fiber exposed to the liquid in the reservoir, is closed. The upper end 46 of the fiber, that is, the end in the sterile first portion 20 of the device 10, may be open or closed dependant on the porosity of the fiber. Preferably, the end of the fiber in the sterile portion is open to facilitate solution flow.

As shown in FIG. 2, the liquid from the reservoir, that is, the liquid source, enters the second portion 22 to be in liquid communication with the fiber 44 through a plurality of openings 48. As shown, at least one of the openings 48 is preferably positioned at the top of the second portion 22 so that air is not trapped when the device is submerged in a liquid in a manner which inhibits the wicking through the fiber. In practice, the liquid level will be higher on the plant stem than is shown in FIG. 2, and it will be apparent that the entire device 10 will be significantly submerged in water when a flower with the device attached is placed in a vase. Even though this submersion will cause some hydraulic pressure to be exerted on the device, the water or liquid drawn through the membrane is still drawn by the plant essentially by wicking force or capillary action.

Figure 3:
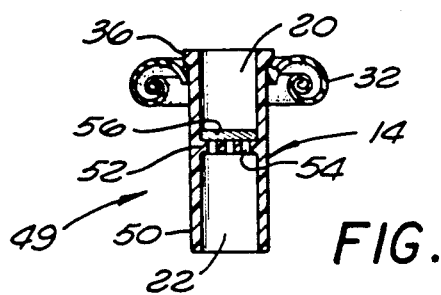

Alternative embodiments are shown in FIGS. 3 and 4. In FIG. 3, the conduit 14 of a device 49 is seen to be in the form of a tubular rigid plastic conduit having a rigid annular edge wall 50, and an intermediate platform 52 between the first portion 20 and the second portion 22. This platform 52 is seen to include perforations 54 which permit the influx of liquid from the second portion 22 to a filtration means which is seen to comprise a membrane 56 which is formed from a capillary-pore membrane such as those sold by the Nuclepore Corporation. These membranes are polycarbonate and/or polyester films, or laminates of such polymers, which are exposed to sufficient gamma or other radiation, or other means, to form a perforate surface having a porosity defined by pores having a diameter of up to about 0.45 microns, preferably up to about 0.2 microns. A Nuclepore or similar film having a porosity of this amount will serve as a membrane filtration means sufficient to permit the wicking of liquid from the reservoir to the stem, but this porosity is insufficient to permit the passage of microorganisms with the liquid.

The membrane 56 is sealed at the edges adjacent the edge wall 50, by a sealing means such as a biocompatible silicon rubber so that the flow from the second portion 22 to the first portion 20 can take place only through the described pores. The resilient sealing means 32 in FIG. 3 is seen to be convoluted or rolled down around the wall 50 of the first portion 20, and retained by a ridge 36, to facilitate the insertion of the basal end of the stem of the flower (not specifically shown). After insertion of the stem into the first portion 20, the convoluted sealing means 32 is then rolled upwardly to tightly seal the stem against the influx of fluid. This tight seal against the stem is desired due to the fact that the entire device may be submerged in the liquid in the reservoir or vase.

Any of the sealing means described herein may also be molded or otherwise formed with a graduated or tapered inner diameter so that a variety of stem diameters may be received. Strain on the Krayton or Hytrel (DuPont) material may be minimized by molding a cap to fit over the upper end of the conduit, the cap having a tubular member extending therefrom to form the seal around the stem. It should be understood that the tubular stem sealing means can extend inwardly or outwardly from the stem receiving conduit, and that a plurality of stem receiving tubes can advantageously be positioned on one such molded cap.

Another alternative device 60 is shown in FIG. 4. In this embodiment, the entire conduit 14 is formed from a resilient tube, for example, latex, which receives the basal end 18 of the stem in the tight, sealing arrangement described above. In this embodiment, a sealing means 40 seals the first portion 20 from the second portion 22, and the looped fiber 44 courses from a porous mass 62 through the sealing means 40 to the second portion 22 and thereafter back through the sealing means to the porous mass 62. The porous mass may be formed from any sponge or sponge-like means that will draw liquid by capillary action, such as a porous urethane polymer. This sponge 62 wicks fluid from the upper ends of the fiber 44 to the natural xylem tissue of the stem 18. In certain uses or for certain varietals, the sponge means 62 provides significant advantages.

It should be understood that the invention comprises maintaining the stem of the plant in contact with the liquid under conditions such that the liquid is presented to the stem only after passage through the filtration means described herein. Any of the specific filtration means may be interchanged in the embodiments shown in FIGS. 2, 3 and 4, and, for example, the sponge means 62 may be employed with any of the described filtration devices.

Prior to the insertion of the plant or stem into the sterile portion of any of the devices described herein, the inserted portion may be first cleaned or dipped in a non-phytotoxic bactericide solution so that the stem receiving portion is maintained free of microorganisms. In addition, an internal bactericidal member within the sterile portion, such as is shown in FIG. 5, provides significant advantages.

In FIG. 5, a device 68 comprises a first or upper portion 70 and a second or lower portion 72, both portions being cylindrical and shown in cross-section in the Figure. The upper portion 70 has an upper cylindrical member 74 and a lower, inverted cup-like member 76. The lower portion 72 has a lower, essentially cylindrical member 78 and an upper cup-like member 80 which closely mates with the lower cup-like member 76 in a snap-fit relationship so that the portions 70 and 72 can be retained in the cooperating relationship shown. The lower portion 72 has lateral openings 82 and, if desired, a bottom opening 84 to permit the influx of water or liquid into the member 78. The portion 72 also includes a sponge 86, in the cup member 80, which is in fluid communication with a filtration means which comprises a hollow fiber 88, such as those described above. The sponge 86 may be impregnated with a bactericidal agent, such as is discussed with respect to the sponge 90 shown in FIG. 5. One end of the fiber 88 is seen to be received in the sponge, the fiber then looping into the liquid receiving portion 78 of the device, with the other end of the fiber then returning to be received in the sponge.

The upper cylindrical member 74 receives a hollow cylindrical sponge 90, which includes a portion 92 which extends above the top of the member 74 to form a closed apex. This sponge contains a bactericidal agent and serves as a stem disinfecting means. For example, the sponge may be soaked in a 0.03% solution of 8-hydroxy-quinoline citrate prior to insertion into the member 74. A sponge which is complexed with molecular iodine, known in the art, is particularly advantageous in the dissolution of the iodine is limited while retaining the bactericidal effect.

The upper portion 70 and part of the lower portion 72 is encapsulated in a resilient coating 100 which extends from the apex of the upper sponge part 92, along the sides and inverted cup portion of the upper portion 70, and into an upper part 102 of the lower portion 72. The coating 100 embeds the fiber 88 in place, and creates a closed space 104 within the upper portion 70, including the sponges 86 and 90 and the tips of the fiber 88, which may be sterilized and maintain such sterility against the influx of microorganisms due to the inhibitory porosity of the fiber 88.

This coating, like the potting material which forms the sealing means 40 referred to above, should be non-phytotoxic, and non-invasive as to the pores or porosity of the fiber so that the lumen of the fiber and the flow of liquid is not inhibited. In this embodiment, the coating is preferably a vinyl polymer known as plastisol. Specifically, a plastisol manufactured by the Goray Co. of Anaheim, Calif. and sold under the designation RFB-27-1 has been found to be particularly satisfactory.

The device 68 shown in FIG. 5 is assembled by first inserting the ends of the fiber into a slot in the sponge 86, and placing the sponge and fiber so that the lower end of the fiber extends into the lower portion 72. The sponge 90, impregnated with a bacteriocidal agent, is then inserted into the upper portion 70 and the two portions are assembled into the mating relationship shown. The sponge 86 is seen to be held firmly against the cup member 80 by the cup member 76. The device 68 is then inverted, and dipped into a heated plastisol to a level sufficient for the plastisol to flow into the lateral openings 82 and seal the fiber and sponge 86 to the lower portion 72. Preferably, the sponges 86 and 90 are wetted prior to assembly, and after assembly the device is sterilized with gamma radiation or an electron beam and placed in sterile packaging.

In use, the tip of the apex of the coated upper portion 70 is cut off or punctured by the user, so as to provide an open, resilient tubular member for the insertion of the stem of the plant or flower onto the space 104 until the basal end of the stem abuts the sponge 86. The resilient coating around the apex seals against the stem, and the resilient action of the sponge 90 serves to perform a sterile wipe function on the stem and to retain the device on the inserted stem. The device and the stem may then be inserted in water, and the xylem tissue in the stem wicks water, free of microorganisms, through the fiber 88 sponge 86 where it flows by capillary action to the stem in the sterile space 104.

In an alternative embodiment, the entire conduit could be formed from a porous plastic material such as the spun, high density polyethylene/polypropylene material which is used to form leach pipes or the tips of ball point pens, and which has an effective porosity which is insufficient to permit the passage of microorganisms. This conduit could have a single, upper open end which is closed with plastisol or other sealing medium around the stem such as is described with respect to FIG. 5. This closed, porous conduit would thus constitute a porous membrane having a porosity which is insufficient to permit the passage of microorganisms with the liquid which is drawn solely by capillary action through a membrane to the plant.

In yet another embodiment, FIG. 6 shows a unitary filtration apparatus 110 which comprises a tube or conduit 112 which may be formed from polycarbonate, acrylic or styrene polymers or other appropriate material, and which is shown to have an overall length of about one and one-half inches. The conduit 112, for example, has been made from a styrene tube having an outer diameter of ¼ inch with a wall thickness of 1/16 inch. A stem sealing means 114, preferably an elastic film such as latex rubber or preferably the Krayton brand thermoplastic rubber manufactured by the Shell Chemical Company, is attached to the upper end of the conduit 112. A tube of Krayton D 3402 with a diameter of about 3/16 inch and a wall thickness of from 14–40 thousandths of an inch may be cut to an appropriate length, stretched over the top of the conduit 112, and heat sealed or sonic welded at the opposite end to form a closed apex 116 shown in the drawing. Ridges such as the ridges 36 and 38 in FIG. 2 may be included around the upper end of the conduit 112 to assist in the sealing of the film 144 against the conduit.

As will be apparent from the foregoing description, the apex 116 of the sealing means 114 is cut by the user, and the cut basal end of a plant stem inserted into a sterile, inner portion 117 of the conduit 112 with the cut apex forming a seal around the stem which resists the influx of microorganisms, as does the seal formed by the lower end 118 of the tube 114 with the upper end of the conduit 112.

A filtration means is provided at the lower end of the conduit 112 by the placement of a disc 120 which has a porosity sufficient to permit the passage of liquid, but insufficient to permit the passage of microorganisms. In this case, a capillary-pore membrane such as those sold by the Nuclepore Corporation and described above with respect to FIG. 3 is employed. The disc 120 is secured to and sealed against the end of the conduit 112 with a solvent such as ethylene dichloride or other appropriate adhesives.

A porous, protective cap 122 is secured to the lower end of the conduit 112 after the attachment of the filtration disc 120, by the use of an adhesive such as FMD Locktite adhesive which is placed between the inner edges 124 of the cap 122 and the side edges 126 of the conduit 112 so that the flow of liquid through the filter disc 120 is not impeded. Alternatively, the porous cap 122 may be attached to the device by sonic welding or may be held on by a pressure captivation fit, as may be appropriate. The cap may be made of a variety of materials which are porous and which will protect the disc 120, such as a woven polyester which has sufficient porosity to pass water at a high rate but is yet able to act as a pre-filter to remove large particles which would otherwise clog the microorganism filtration means. More particularly, the hydrophilic high density polyethylene porous plastic material manufactured by Porex Technologies of Fairburn, Ga., with a nominal porosity of about 30 microns and an effective filtration of down to 4.5 microns (acting as a depth filter), has shown significant advantages in that it has passed water in amounts of 25 ml/day to roses in the apparatus of FIG. 6. It should be understood that if the cap 122 is formed from a material which has a porosity of the type described for the disc 120, the disc could be omitted and the cap 122 would serve as the filtration means, i.e., filtration membrane, of the invention.

The apparatus shown in FIG. 6 also includes, as a means for exhausting air from the inner portion 117 of the apparatus 110, an air permeable but liquid impermeable portion such as a hydrophobic porous plastic port 128 which is secured by adhesive or other means to the upper end of the conduit 112 above the level of the cut end of the stem which is inserted into the sterile portion or cavity 117. The 10 micron Porex brand porous plastic described above, when employed in a hydrophobic state, will pass air but will not permit the passage of microorganism containing liquid due to the hydrophobic nature of the material. The Porex brand porous plastic material may be purchased in either hydrophobic or hydrophilic form. When a device of the invention containing the air exhausting means 128 is inserted into water, the air contained within the sterile stem containing cavity is quickly purged from the cavity by water entering through the filtration means so the water level easily rises to the height of the cut end of the stem.

The device shown in FIG. 6 can be used to illustrate an aspect of the invention which is particularly advantageous in introducing water or nutrient liquid into the stem receiving portion of the device in instances in which the air exhausting plug 128 is not employed. In such an instance, the filter disc or membrane 120 is impregnated during assembly with a non-phytotoxic, water soluble substance which will inhibit the passage of air through the membrane. For example, the disc 120 may be coated with glycerine which changes the tangent angle of the pores in the membrane to render the membrane impervious to the passage of air up to a pressure of 10 psi.

After the elastic tube 114 is placed over the conduit 112, but before the sealing of the upper end of the tube, a vacuum is formed within the cavity 117. In practice, the upper end of the elastic Krayton film 114 has been stretched over a one-half inch flexible tube, connected to a vacuum pump, which evacuates the cavity 117 pulling the flexible film into the device. The elastic film was then pulled out of the device, and sonically welded to seal the vacuum, and cut above the sonic weld line to form the closed apex 116. With the glycerine closing the only inlet to the cavity, and since glycerine has a high vapor point and will not evaporate, the vacuum may be maintained for long periods of time.

Immediately prior to use, the filter end of the evacuated device is placed in water. The water dilutes and removes the viscous coating, and the vacuum draws sterile water into the device to substantially fill the cavity 117 in less than one minute. When the cavity is filled, the apex 116 is cut below the sonic weld and the stem, preferably cut to a 45 degree angle, is inserted as described above.

After a device such as the device 110 of FIG. 6 is filled with water and the stem of the plant is inserted, it may be appropriate to transport the plant for a short distance prior to placing the plant, e.g., a flower, in a vase. In yet another aspect of the invention, the lower end of the device 110 may be equipped with a removable cap, adapted to seal the water with the device, which may be removed for the filling of the device and then replaced for transport. For example, an additional water impermeable cap of a shape similar to the cap 122 may be placed over the lower end of the device. Alternatively, a plastic or coated paper disc with a patterned ring of water resistant adhesive around the outer edge may be employed to seal the device during transport.

Any of the unitary stem receiving filtering apparatus described above may be equipped with a bladder attached to the lower portion of the conduit, for example, and adapted to serve as a temporary reservoir and feed liquid to the plant during transport. The Krayton or other elastic film is particularly adaptable for this purpose, and a tube of such material may be filled with tap water and stretched over the lower end of the conduit of the apparatus shown in FIG. 6.

The wicking filtration device has been shown to provide significant advantages in extending and preserving the life of cut flowers. For example, a cut Cara-mia rose normally has a life of no more than five days, prior to wilting. However, when inserted into the device of the invention as is described with respect to FIG. 2, with a sponge means similar to the sponge 86 in the first portion 20 beneath the basal end of the stem and in fluid communication with the upper end of the fiber, and inserted in water, both long stem and spray varietals of the Caramia rose have lasted in excess of 49 days without wilting and the spray varietals have supported continued blossoming of unopened blossoms during that period. The filtration apparatus of the invention is adaptable to a wide variety of additional plants, in particular, bunch-type crops such as grapes wherein the apparatus is installed on the primary stem of a bunch after harvest with a transport bladder attached.

As referred to above, a vascular plant is a closed-loop biological pump wherein water containing microelements is transported from the roots to the leaves by a combination of "pull" from transpiration and "push" from the roots. Since the filtration device described in FIGS. 1-6 depends on transpiration from the leaves and the wicking of liquid through the filter, some longer-stemmed plants benefit from a positive pressure at the basal end of the stem which approximates the root pressure in the natural plant. Depending upon the particular varietal, plants or flowers with stems shorter than 7 to 8 inches permit a significant extension of plant life solely with the above-described filtration device, but longer stemmed varietals may suffer from what is termed "neck droop" after several days. While it is known to apply a distinctly higher pressure to plant cuttings, see, for example, the patent to Carlisle U.S. Pat. No. 4,103,457, I have found that the deficiencies suffered from cavitation in plants can be overcome only by the use of a pressure from about 0.9 to about 1.2 psi at the end of the stem. At pressures less than 0.9 psi, long stemmed plants cavitate and wilt. At pressures greater than 1.2 psi, the plant vascular system is over pressurized and damaged, causing excessive weeping of water from the bottom side of the leaves.

FIG. 7 shows a filtration device which may be employed either in the wicking filtration system described above in FIGS. 1-6, or in a positive pressure filtration system. In FIG. 7, a filtration device 150 is shown to be comprised of a conduit portion 152 and a stem sealing means 154. The conduit 152 and the means 154 are similar to the conduits and sealing means described above with respect to FIGS. 1-6, and are made of similar materials.

The device 150 also includes an end cap 156, also constructed from thermoplastic material, which includes an annular outer wall 160 and an annular inner wall 162 which form an annular valley 164 therebetween. The cap 156 also includes a lower ring shaped projection 166, including an outer, inwardly tapering wall 168. The ring structure 166 forms an opening 170 which permits the flow of liquid through the center portion of the end cap 156.

The lower end of the conduit 152 includes an inwardly projecting annular collar 172 which joins an internal annulus 174, and forming an opening 176 which permits the flow of liquid into a cavity 178 of the conduit 152 from the opening 170 in the end cap 156.

A membrane filter 180, having a porosity sufficient to inhibit the passage of microorganisms as set forth above, and a pre-filter 182 are disposed between the conduit portion 152 and the end cap 156. When the device 150 is assembled, the filter 180 and pre-filter 182 are placed between an annular ridge 184 on the top of the inner wall 162, and a shoulder 186 of the annular collar 172. A lower annular bottom portion 188 of the conduit 152 is then press-fitted into the valley 164 of the end cap 156 and sonically welded in the valley. Welding lugs 190 are positioned on the lower edge of the ring 188 to aid in sonic welding. It should be understood that RF welding or a suitable adhesive may also be employed.

When the conduit 152 and end cap 156 are thus secured, the ridge 184 forces the filter 180 and pre-filter 182 against the annular shoulder 186 with sufficient force to seal the filtering members between the respective abutting parts. This force is sufficient to prevent the passage of liquid around the filter 180, so that all liquid from the opening 170 must flow through the filter 180 to reach the cavity 178.

As described above with respect to FIG. 6, the prefilter 182 has sufficient porosity (e.g. down to about 10 microns) to remove large particles and debris such as microscopic calcium and iron salts which would otherwise clog the membrane 180. The internal annulus 174 is seen to form an annular void 192 in the cavity 178.

Figure 8:
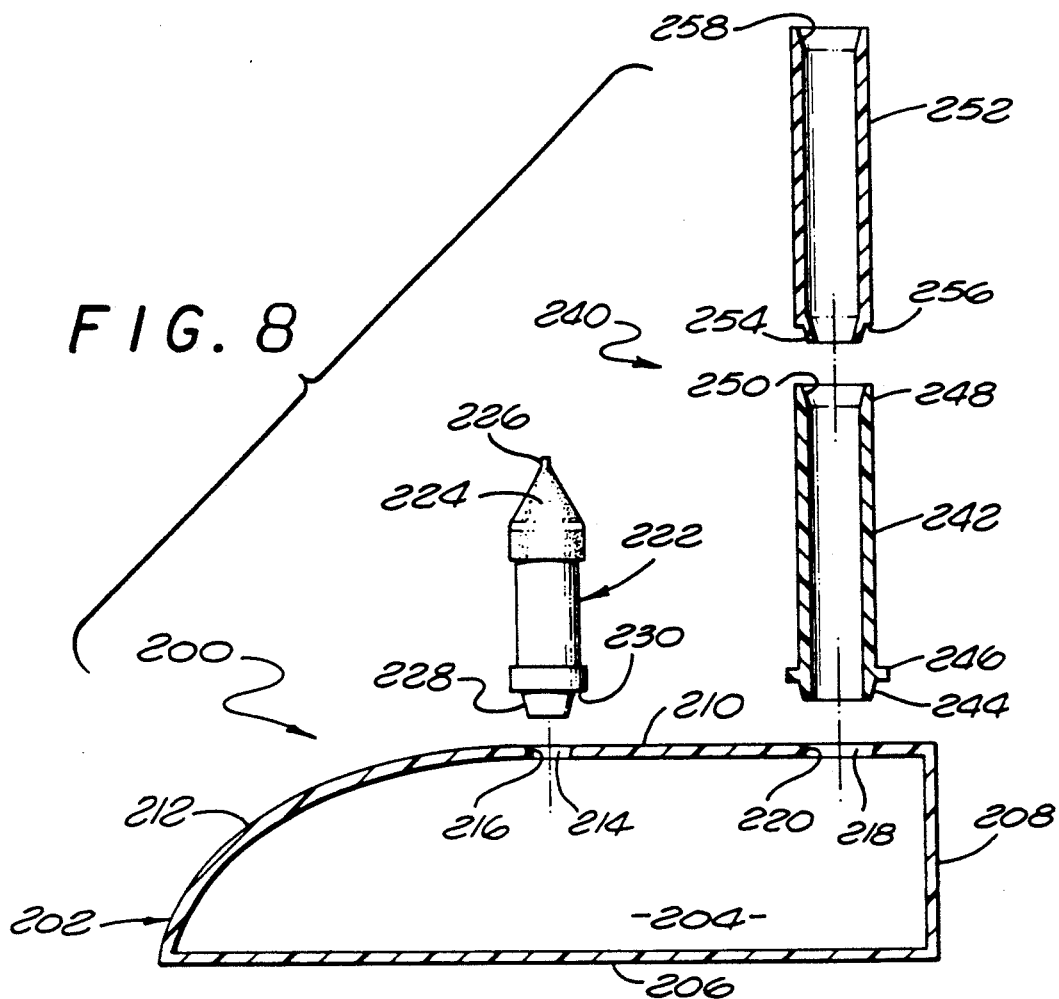
FIG. 8 is a side view, partially in cross-section, of a reservoir assembly for use with a filtration and support device such as is shown in FIG. 7.

In FIG. 8, a plant or flower display device 200 includes a first portion 202 which is adapted to contain liquid in a cavity 204 which is formed between a lower wall 206, a back wall 208, a top wall 210 and a curved front wall 212. The first portion or reservoir 202 may be constructed from thermoplastic resin by a wide variety of molding techniques, and preferably is formed from 2 or more pieces which are sonic welded or adhesively joined in order to facilitate the molding process. The top wall 210 is shown to include a first opening 214 defined by an annular tapering edge 216, an second opening 218 which is defined by a tapering edge 220.

A second portion 222 of the device 200 is seen in an elevated position above the first portion 202. The second portion 222 is the filtration device described in FIG. 7, and accordingly includes a sealing means 224 with a sonically-welded apex 226 which may be adapted to enclose the basal portion of the stem of a plant and seal the stem against the egress of liquid from the filtration device 222. When the stem of the plant is this inserted through the sealing means 224, the cut end of the stem will be understood to be received within the portion 222, in an area shown in FIG. 7 by the reference numeral 178.

The portion 222 also includes an end cap such as the end cap 156 in FIG. 7, and includes an annular inwardly tapering end piece 228, which mates with the tapering edge 216 in a liquid sealing relationship, and a shoulder 230 which abuts the top wall 210 when the portion 222 is inserted into the portion 202.

The display device 200 also includes means, designated generally by the reference numeral 240, for generating pressure on the liquid in the cavity 204 and thus on the cut end of the stem in the second portion or filtration device 222. The means 240 comprises a first column portion 242, which includes an annular tapered lower edge 244 and a seating ring 246 adjacent thereto. The tapered edge 244 mates with the edge 220 in a liquid-sealing arrangement. The ring 246 provides support for the column 242 when mounted by abutting the top wall 210 surrounding the opening 218. The column 242 also includes an upper end 248 which includes an annular, internal tapered edge 250.

A second column 252 is also provided, having a lower end which includes a tapered annular edge 254 and a shoulder 256. The tapered edge 254 mates in a sealing arrangement with the internal tapered edge 250 in a liquid-sealing fit. The lower shoulder 256 adjacent to the ring 254 provides additional sealing and support by resting on the upper end 248 of the column 242. The column 252 also includes an additional inner tapered upper edge 258 so that additional columns may be stacked to increase the pressure within the cavity 204.

In use, a flower or plant is inserted into the device 222, as described above, by cutting the sealed apex 226. The device 222 is then inserted in a sealed relationship in the opening 214. Thereafter, the column 242 is inserted in a sealing relationship in the opening 218 and the cavity 204 is filled with water or nutrient solution. Additional columns such as the column 252 are then added to increase the height of the liquid, preferably to a height approximately equal to the flower or uppermost leaf, that is, the upper end of the stem. As stated above, the optimal pressure for most varietals is from about 0.9 to 1.2 psi. It should be understood that the height of the columns, and the pressure produced, will depend largely on the diameter of the column members. Generally, a column having an inner diameter of about ¼ inch and a height approximately equal to the length of the stem above the liquid in the cavity 204 has been found to provide significant advantages.

It should be understood that a variety of locking, sealing and attachment devices may be employed with respect to the device 222 and the column members 242 and 252. For example, interlocking tabs may be provided on the top wall 210 and the device 222 and column member 242, or threaded fittings may be employed with gaskets if desired. Such means may also be employed between the respective collar members. In addition, it may be advantageous to equip the opening 214 with a ball valve or duckbill valve which is opened by the insertion of the tapered end 228 so that when the device 222 is removed from the display device 200, the egress of water from the opening 214 due to the pressure in the column 240 is inhibited. In addition, it should be understood that a wide variety of shapes and sizes of the display device may be constructed, and a nearly unlimited number of filtration devices 222 may be inserted in a plurality of openings in the reservoir 202. For example, a reservoir equipped with a large number of valve-closed openings may be provided with water pressure from a flexible tube leading to an overhead reservoir, and cut flowers in spearing filtration devices inserted into the reservoir for display in a flower shop.

Another novel feature of the discovery of the benefits which result from the application of the described discovery on the effect of pressure on the cut end of the flower stem is that a cut flower may be stored or transported by positioning to plant so that positive pressure on the water column within the plant stem is increased. The life of a stored flower may be increased by placing inserting the basal end of the plant in a filtration apparatus having a filter means and a portion containing liquid, and placing the plant in a position which causes the water column formed by the vascular system and the liquid in the apparatus to facilitate the "pull" of water into the vascular system. For example, the plant/apparatus combination may be placed with the stem in a position so that the distal end (e.g., the flower end of the plant) is disposed at or below the level of the liquid in the apparatus. Preferably, the desired positive pressure may be created by storing or transporting the flower in an inverted position with the with the cavity in the filtration device filled with liquid. As used with respect to this aspect of the invention, the term inverted means to position the flower or leaf end of the plant at the level below the basal end to which the filtration apparatus is attached.

In FIG. 7, a construction is shown which provides significant advantages. For example, the filter 180 and/or prefilter 182 of the device 150 could be coated with glycerine, as described above, and a vacuum formed within the cavity 178. When the flowers are cut in the field, the evacuated device is inserted in water and the cavity 178 fills. The sealing means 154 is then cut and the flower inserted. The flower is then inverted, so that liquid in the cavity 178 provides sufficient pressure to maintain the positive pressure on the flowers in the flowers vascular system. Since the water in the cavity 178 has been effectively sterilized by the filter 180, the vascular system is not blocked by the growth of bacteria. If the inserted stem has significant bacteria or if the stem is not appropriately cleaned, the bactericidal sponge described above with respect to FIG. 5 maybe employed within the sealing means 154.

As the inverted flower draws water from the cavity 178, the water level in the cavity will slowly move toward the sealing means 154 and if the level falls below the cut end of the stem the vascular system will draw air and the plant may wilt. Accordingly, the annulus 174 in the device shown in FIG. 7 provides a means to position the cut end of the stem a sufficient distance from the bottom of the conduit 152 so that any air which enters the cavity 174, when the flower is inverted, will collect in the annular void or cavity 192 and not be drawn into the plants vascular system. An alternative stem blocking member could be employed such as a perforate or sieve-like screen disposed, for example, radially across the mid portion of the cavity 117 in FIG. 6. This would maintain the cut stem at a distance from the filter end of the conduit 112 so that a sufficient amount of liquid may be drawn into the cut flower, in an inverted position, before the liquid falls below the stem blocking means.

The pressurizing means shown in FIG. 8 has significant advantages, particularly with longer stemmed varietals. For example, long stem flowers including Royalty, Cara-mia and Goldenwave roses; Apple Blossom varietal gerba; Marble varietal chrysanthemum; White Fern varietal carnation; Leather Leaf varietal fern and Baby Breath varietal drosophlia have endured longer than 20 days without any indication of wilting or neck drooping.

Figure 9:
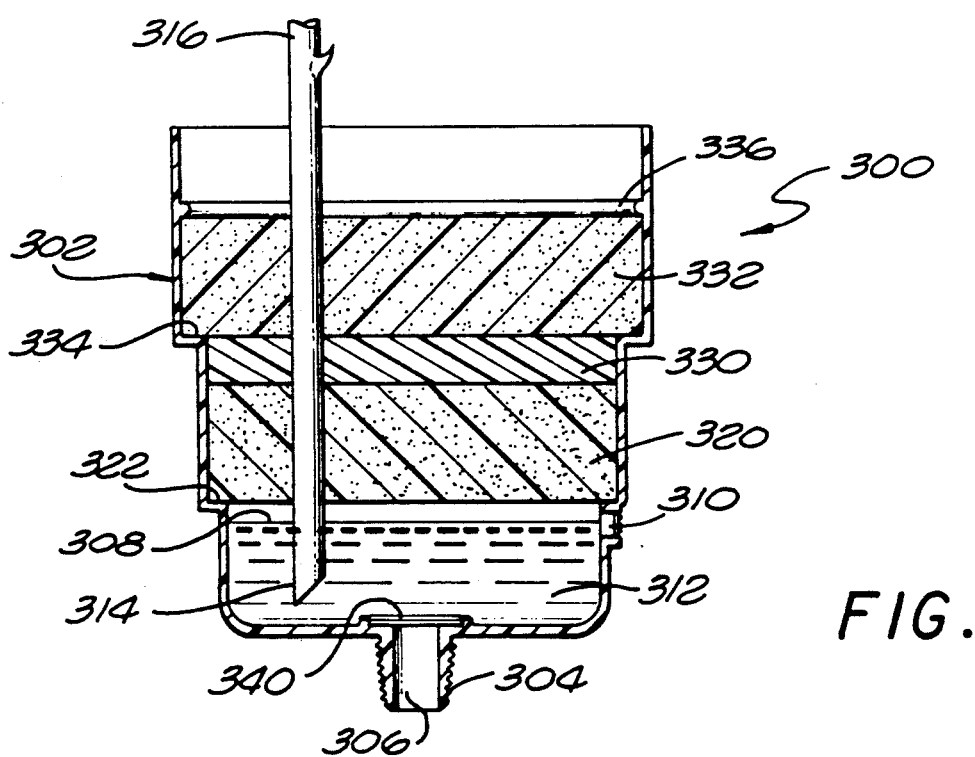
FIG. 9 is a sectional side view of another stem support and sealing device of the invention.

FIG. 9 depicts a novel stem support and sealing means which provides significant advantages when employed in combination with the filtration and pressure devices of the invention. Briefly, a novel means for sealing the stem of a plant is shown wherein a portion defining an area adapted to receive a cut end of a stem (preferably a sterile portion) includes a layer of an initially imperforate and stem-penetrable sealing means such as a stem-permeable elastomer, sealed to the portion, which is sufficiently flowable and has sufficient self-affinity or elasticity to form a seal against the inserted stem. Preferably, the elastomer forms a seal which is sufficient to resist the liquid pressure or 0.9 to 1.2 psi, and most preferably forms an aseptic seal against the stem.

In FIG. 9, a support and sealing device 300 includes an essentially cylindrical cup-shaped element 302 which is formed from a polymeric material such as polycarbonate or the like, although other materials may be employed. The cup 302 includes a tapered, threaded connection nipple 304 for attaching the sealing device 300 to a water source such as the reservoir 208 as is shown in FIG. 8. The cup may also be attached directly to the water column or to another source of liquid pressure as described above with appropriate sealing and connecting means such as will be apparent to one of skill in the art.

As is apparent from the drawing, water or nutrient solution may flow through an opening 306 in the connector 304 to a water height 308 which is determined by the water level in the attached column (as shown in FIG. 8) or the pressure which is otherwise provided on the liquid source, e.g., gas or mechanical pressure on the liquid. Since the device 300 is sealed with respect to the exit of air during the influx of liquid through the opening 306, a hydrophobic air vent 310 is included at the top of a lower water containing portion 312 of the cup 302 to permit the escape of air while inhibiting the influx of microorganisms, yet retain the water in the portion 312. The device is proportioned so that the water level 308 is positioned above a lower end 314 of the stem 316 which is inserted into the device 300 as hereinafter described.

The device further includes at least one layer of rigid, penetrable foam 320 which is seen in the drawing to be positioned on a ledge 322. This foam can be restrained in a variety of methods, for example, by adhesive, but a press fit of a slightly over-size precut foam disc into the surrounding walls of the cup 302 will generally be sufficient. The foam may be hydrophilic or hydrophobic, although it is preferably hydrophilic, and a urethane foam having a compressive strength of about 5 to 18 psi such as the HP-3 foam system marketed by S.M.S and Associates of Carlsbad, Calif. or the non-friable foam sold by the Polymer Development Laboratories, Inc. under the trade designation PDL 205-1.15 are advantageous. In commercial production, this foam support means can be foamed in place within the cup 302.

A layer of penetrable elastomeric sealing elastomer 330, preferably hydrophobic, is positioned above the foam 320 and sealed against the inside of the cup 302. This material is chosen to be sufficiently elastic to flow at about room temperature, and to rebond and seal to itself and the inserted stem 316 when the stem is inserted into the device 300, to form an aseptic and water-tight seal within the 0.9 to 1.2 pressure range of the liquid. This self-healing consistency may be attained by employing an elastomer gel, preferably a silicone gel, having a low cross-link density, that is, a polymer with many reactive sites still available for rebonding. For example, a cross-link density of about 40% is prefered. The elastomer preferably has a penetrability as measured by the ASTM D 1403 testing procedure, using a one-quarter scale cone for five seconds, of from about 13.2 mm (a limit beyond which the elastomer may flow into the foam or be displaced by the pressure within the portion 312) to about 5.5 mm (beyond which the elastomer will not be sufficiently elastic and flowable to form a seal against the inserted stem), and most preferably about 6.0 to 7.0 mm. Generally, an RTV silicone rubber having a high self-affinity is employed, and the Shin-Etsu silicone gel sold by Shin-Etsu Silicones of America, Inc. under the designation KE1052A/B is preferred. This material is a transparent two-part liquid silicone which cures into the desired flowable elastomer. As opposed to perforate seals, the initally imperforate and self-sealing elastomeric seal of the invention allows the insertion of a wide variety of stem sizes and shapes in widely varied arrangements.

Above the elastomer 330 is a second layer of foam 332, which is similar to the layer 320 in that it may be hydrophilic or hydrophobic, and sufficiently rigid to support the stem. This foam is also captivated with the cup, such as by a ledge 334 and a ridge 336, or by adhesive or bonding such as is described above with respect to the foam layer 320. Preferably, a support grid is inserted into the cup 302 directly above the foam 332, the grid having openings sufficiently large to permit the insertion of the stem or stems 316. Such a grid will provide additional support for the stem 316 if desired.

A layer of penetrable, self curing liquid adhesive may be applied in a thin film (ca. 1 mm) over the foam 320 to inhibit leakage of the uncured elastomer 330 into the foam during the casting process. Any thin-film membrane having a catalyst which is compatible with the polymerization reaction of the elastomer 330 may be employed, although adhesives of the type sold by Shin-Etsu Silicones of America under the trade designation KE 66 RTV are preferred. In addition, a layer of swellable, hydroscopic pulverulent material may advantageously be placed above the adhesive described in this paragraph. This powdered material is preferably hydroxyethyl cellulose of about 60 mesh (e.g., Union Carbide QP-4400H Cellosize) and is sufficiently swellable to provide an additional seal against air and water leakage. If the adhesive and swellable powder described in this paragraph are employed, the elastomer 330 may be cast directly on the pulverulent material.

Optionally, an additional layer of swellable, hydroscopic powder may also be placed above the elastomer 330, e.g., at about a 6 mm thickness, to remove any water which may remain on the stem and interfere with the sealing of the elastomer. Additional advantages may also be obtained from the addition, to the inner portion 312, of controlled or time release chemical formulations such as kinetins or other growth or preservative factors.

According to the invention, a filtration means 340, such as has been described above with respect to the other drawings, is attached across the opening 306 so that the inner portion 312 receives liquid in the absence of deleterious microorganisms and air emboli. Due to the filtration means 340 and the seal around the stem by the sealing elastomer 330, the inner portion 312 is maintained as a sterile conduit portion. If desired, a microbicidal means such as a time release bactericidal or fungicidal device can be advantageously attached or inserted within the portion 312.

In use, a plant stem is preferably cut at about a 45 degree angle to form an insertion point as is shown in FIG. 9. The stem is then pressed into the top layer of foam 332 of the stem support device 300. The foam parts to permit the insertion of the stem through the elastomer 330, and thereafter through the foam 320 to the inner sterile portion 312. The elastomer flows to bond to the stem 316 and seal the inner portion 312 against the influx of microorganism and the escape of liquid. The device 300 is then attached to the liquid source by the nipple 304.

From the foregoing description the essential characteristics of the invention can be readily ascertained and, without departing from the spirit and scope thereof, the invention can be adapted to various usages. Changes in form and substitution of equivalents are contemplated as circumstances may suggest or render expedient, and although specific terms have been employed herein, they are intended in a descriptive sense and not for purposes of limitation.

What is claimed is:

1. A device for providing liquid from a reservoir to a plant having a stem, comprising:
   an apparatus having a sterile conduit portion adapted to receive a basal end of the stem, and a portion adapted to be disposed in the liquid;
   a filter means having an effective porosity of less than about 0.45 micron and having a first part in communication with the conduit portion and a second part in communication with the portion adapted to be disposed in the liquid, the filter being adapted to transport liquid to the stem and disposed in a manner which seals the conduit portion from the reservoir so that microorganisms cannot flow to the conduit portion.

2. The device of claim 1 wherein the filter means has an effective porosity of less than about 0.2 micron.

3. The device of claim 1 or 2 wherein the sterile conduit portion includes a microbicidal means.

4. A device for providing liquid from a liquid source to a plant having a stem, comprising:

an apparatus having a conduit portion adapted to receive a basal end of the stem and including means to seal the conduit portion and the basal end therewithin from the influx of microorganisms, and a second portion adapted to be disposed in communication with the liquid;

a filter having an effective porosity of from about 0.05 to about 0.45 microns disposed between the basal end of the stem and the liquid source, the porosity being sufficient to permit the filter to wick the liquid from the liquid source to the basal end of the stem, but capable of excluding the passage of microorganisms with the liquid to the stem.

5. A device for the display of a plant having a stem with a basal portion including a cut end, comprising:

a first portion adapted to contain liquid;

a second portion defining an area adapted to receive the cut end of the stem, and to receive liquid from the first portion;

a sealing means on the second portion, adapted to enclose the basal portion of the stem and seal the stem against the egress of liquid from the device;

a filter having an effective porosity of less than about 0.45 micron disposed between the first and the second portions and disposed to seal the second portion from the first portion in a manner such that microorganisms cannot flow from the first to the second portion; and means for providing a pressure of from about 0.9 to about 1.2 psi on the liquid at cut end of the stem.

6. The device of claim 5 wherein the means for providing pressure comprises a column of liquid extending above the first portion.

7. A method for preserving a plant having a stem, wherein the stem is supplied from a liquid source with a liquid, comprising placing a basal end of the stem in an apparatus having a conduit having sealing means disposed around the stem which seals the conduit portion and the basal end therewithin against the influx of microorganisms; and a filtration means having an effective porosity of less than about 0.45 micron providing the sole flow of liquid from the liquid source to the basal end of the stem and having a porosity which is sufficient to permit the plant to receive liquid from the source, but insufficient to permit the passage of microorganisms with the liquid.

8. The method of claim 7 wherein the filtration means is a membrane having an effective porosity of less than about 0.2 micron.

9. The method of claim 7 wherein the filtration means has a porosity defined by having pores of from about 0.05 to about 0.45 microns diameter.

10. A method for preserving a plant having a stem, wherein the stem is supplied from a liquid source with a liquid, comprising:

placing a basal end of the stem in an apparatus having a conduit having sealing means disposed around the stem which seal the conduit portion and the basal end therewithin against the influx of microorganisms, and a filtration means having an effective porosity of less than about 0.45 micron providing the sole flow of liquid from the liquid source to the basal end of the stem and having a porosity which is sufficient to permit the plant to receive liquid from the source, but insufficient to permit the passage of microorganisms with the liquid; and providing a pressure of from about 0.9 to about 1.2 psi on the liquid at cut end of the stem.

11. The method of claim 10 wherein the filtration means is a membrane having an effective porosity of less than about 0.2 micron.

12. The method of claim 10 or 11 wherein the pressure is provided by a column of liquid extending above the liquid source.

* * * * *